United States Patent
Fukuda et al.

(10) Patent No.: US 9,356,302 B2
(45) Date of Patent: May 31, 2016

(54) FUEL CELL SYSTEM AND METHOD FOR CONTROLLING FUEL CELL SYSTEM

(71) Applicant: HONDA MOTOR CO., LTD., Tokyo (JP)

(72) Inventors: Tetsuya Fukuda, Wako (JP); Kazunori Fukuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 619 days.

(21) Appl. No.: 13/717,703

(22) Filed: Dec. 18, 2012

(65) Prior Publication Data
US 2013/0164641 A1 Jun. 27, 2013

(30) Foreign Application Priority Data

Dec. 26, 2011 (JP) ................. 2011-284167

(51) Int. Cl.
*H01M 8/04* (2016.01)

(52) U.S. Cl.
CPC ...... *H01M 8/04097* (2013.01); *H01M 8/04089* (2013.01); *H01M 8/04559* (2013.01); *H01M 8/04753* (2013.01); *H01M 8/04082* (2013.01); *H01M 8/04104* (2013.01); *H01M 8/04201* (2013.01); *Y02E 60/50* (2013.01)

(58) Field of Classification Search
None
See application file for complete search history.

(56) References Cited

U.S. PATENT DOCUMENTS

| 5,647,733 | A | * | 7/1997 | Augustyn et al. | 417/360 |
| 6,186,254 | B1 | * | 2/2001 | Mufford et al. | 429/442 |
| 7,320,840 | B2 | | 1/2008 | Pechtold et al. | |
| 2003/0148167 | A1 | * | 8/2003 | Sugawara et al. | 429/34 |
| 2007/0248858 | A1 | * | 10/2007 | Blaszczyk et al. | 429/25 |
| 2009/0315392 | A1 | * | 12/2009 | Ichikawa et al. | 307/9.1 |

FOREIGN PATENT DOCUMENTS

| JP | 2002-151116 | 5/2002 |
| JP | 2008-190336 | 8/2008 |
| JP | 2009-146675 | 7/2009 |

OTHER PUBLICATIONS

Japanese Office Action for corresponding JP Application No. 2011-284167, Oct. 7, 2013.

* cited by examiner

*Primary Examiner* — Jeremiah Smith
(74) *Attorney, Agent, or Firm* — Mori & Ward, LLP

(57) ABSTRACT

A fuel cell system includes a fuel cell, a fuel-gas supply path, a fuel-gas circulation path, a first flow adjuster, an ejector, a bypass flow path, and a second flow adjuster. The fuel cell has a fuel-gas flow path and an oxidant-gas flow path. The bypass flow path connects an upstream section of the fuel-gas supply path located upstream of the first flow adjuster to a downstream section of the fuel-gas supply path located downstream of the ejector so as to cause fuel gas to bypass the first flow adjuster and the ejector. The second flow adjuster is provided in the bypass flow path to adjust a flow rate of the fuel gas by intermittently ejecting the fuel gas at a larger flow rate than the first flow adjuster.

5 Claims, 9 Drawing Sheets

FUEL CELL SYSTEM AND METHOD FOR CONTROLLING FUEL CELL SYSTEM

CROSS-REFERENCE TO RELATED APPLICATIONS

The present application claims priority under 35 U.S.C. §119 to Japanese Patent Application No. 2011-284167, filed Dec. 26, 2011, entitled "Fuel Cell System." The contents of this application are incorporated herein by reference in their entirety.

BACKGROUND OF THE INVENTION

1. Field of the Invention

The present application relates to a fuel cell system and a method for controlling the fuel cell system.

2. Discussion of the Background

For example, Japanese Unexamined Patent Application Publication No. 2008-190336 proposes a method of circulating hydrogen by using an ejector to suction anode offgas (i.e., fuel offgas) containing unconsumed hydrogen (i.e., fuel gas) discharged from a fuel cell. In Japanese Unexamined Patent Application Publication No. 2008-190336, an injector (i.e., flow adjuster) is provided upstream of the ejector. By using this injector, the flow rate of new hydrogen flowing toward a nozzle of the ejector is controlled.

SUMMARY OF THE INVENTION

According to one aspect of the present invention, a fuel cell system includes a fuel cell, a fuel-gas supply path, a fuel-gas circulation path, a first flow adjuster, an ejector, a bypass flow path, and a second flow adjuster. The fuel cell has a fuel-gas flow path and an oxidant-gas flow path. The fuel-gas supply path is connected to an inlet of the fuel-gas flow path. Fuel gas to be supplied to the fuel-gas flow path flows through the fuel-gas supply path. The fuel-gas circulation path connects an outlet of the fuel-gas flow path to the fuel-gas supply path to circulate the fuel gas by returning fuel offgas discharged from the fuel-gas flow path to the fuel-gas supply path. The fuel-gas supply path and the fuel-gas circulation path are connected with each other at a connection point. The first flow adjuster is provided in the fuel-gas supply path at a position upstream of the connection point to adjust a flow rate of the fuel gas by intermittently ejecting the fuel gas. The first flow adjuster includes a nozzle. The ejector is provided at the connection point to generate negative pressure by ejecting the fuel gas from the first flow adjuster via the nozzle. The ejector is provided to mix the fuel gas with the fuel offgas by suctioning the fuel offgas from the fuel-gas circulation path using the negative pressure. The bypass flow path connects an upstream section of the fuel-gas supply path located upstream of the first flow adjuster to a downstream section of the fuel-gas supply path located downstream of the ejector so as to cause the fuel gas to bypass the first flow adjuster and the ejector. The second flow adjuster is provided in the bypass flow path to adjust the flow rate of the fuel gas by intermittently ejecting the fuel gas at a larger flow rate than the first flow adjuster.

According to another aspect of the present invention, in a method for controlling a fuel cell system, it is determined whether an operational state of the fuel cell system is one of a steady operational state in which requested electric power to be generated in a fuel cell of the fuel cell system fluctuates within a predetermined variation range, and an unsteady operational state in which the requested electric power fluctuates beyond the predetermined variation range. A required fuel-gas flow rate is calculated based on the requested electric power. It is determined whether or not the required fuel-gas flow rate is within a first suppliable range of a first flow adjuster provided to adjust a flow rate of fuel gas by intermittently ejecting the fuel gas on an upstream side of an ejector provided to generate negative pressure by ejecting the fuel gas from the first flow adjuster. The first flow adjuster and a second flow adjuster are controlled to adjust the flow rate of the fuel gas in correspondence with the required fuel-gas flow rate if it is determined that the operational state is unsteady. The second flow adjuster is provided to adjust the flow rate of the fuel gas by intermittently ejecting the fuel gas at a larger flow rate than the first flow adjuster in a bypass flow path connecting an upstream side of the first flow adjuster to a downstream side of the ejector. Only the first flow adjuster is controlled to adjust the flow rate of the fuel gas if it is determined that the operational state is steady and if it is determined that the required fuel-gas flow rate is within the first suppliable range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
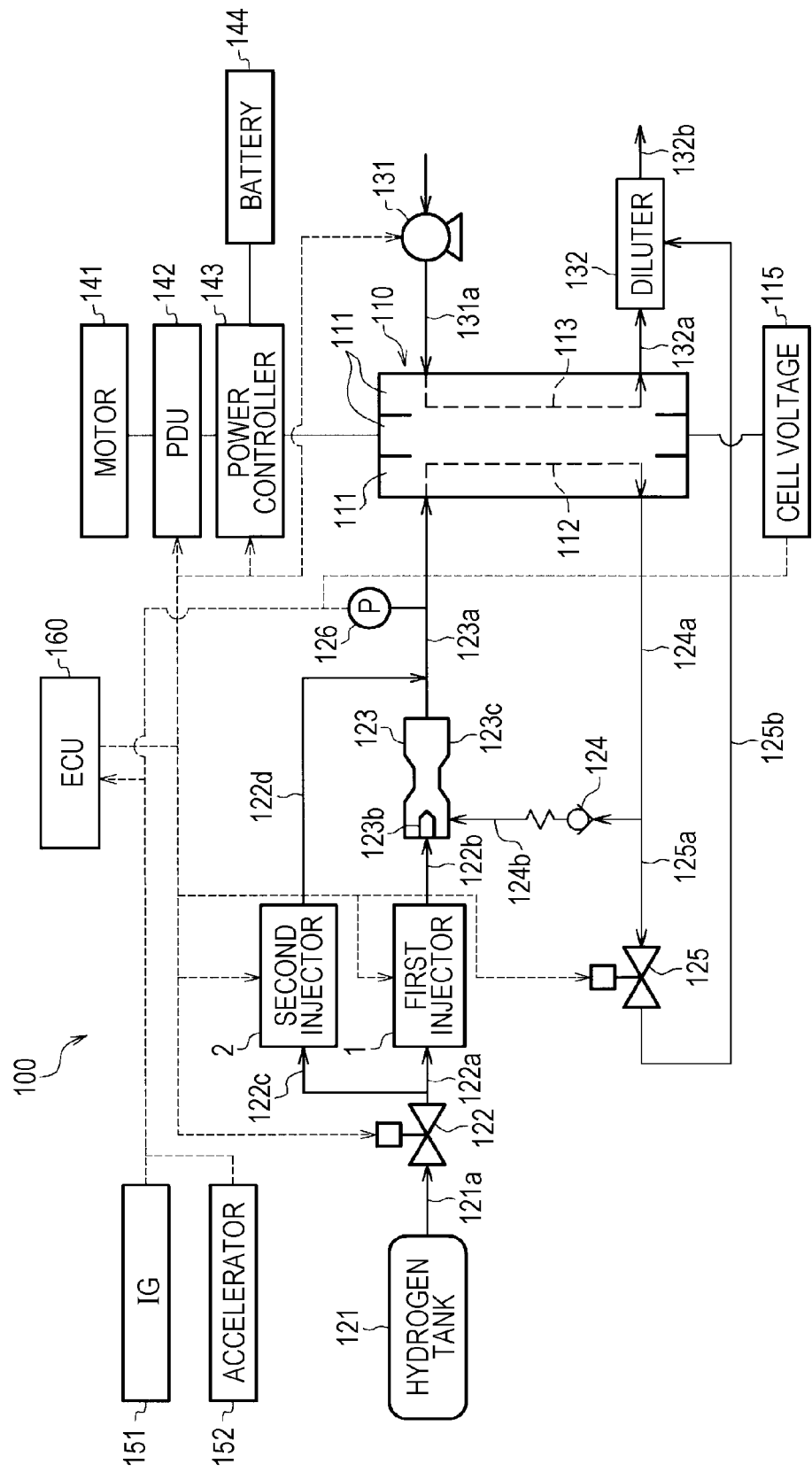
FIG. 1 illustrates the configuration of a fuel cell system according to an embodiment.

The embodiments will now be described with reference to the accompanying drawings, wherein like reference numerals designate corresponding or identical elements throughout the various drawings.

The embodiment of the present application will now be described with reference to FIG. 1 to FIG. 11.

Configuration of Fuel Cell System

A fuel cell system 100 shown in FIG. 1 is installed in a fuel-cell vehicle (i.e., vehicle, mobile unit) (not shown). The fuel-cell vehicle is, for example, a four-wheel vehicle, a three-wheel vehicle, a two-wheel vehicle, a single-wheel vehicle, or a train. However, the fuel cell system 100 may be installed in other types of mobile units, such as a marine vessel or an aircraft.

The fuel cell system 100 includes a fuel cell stack 110, an anode system that feeds and drains hydrogen (i.e., fuel gas, reactive gas) to and from an anode of the fuel cell stack 110, a cathode system that feeds and drains oxygen-containing air (i.e., oxidant gas, reactive gas) to and from a cathode of the fuel cell stack 110, a power control system that controls an electric-power generation process in the fuel cell stack 110, and an electronic control unit (ECU) 160 that electronically controls the above components.

Fuel Cell Stack

The fuel cell stack 110 is formed by stacking a plurality of (e.g., 200 to 400) solid polymer electrolyte unit cells 111. The unit cells 111 are electrically connected in series. Each unit cell 111 includes a membrane electrode assembly (MEA) and two electrically-conductive separators that sandwich the MEA. The MEA includes an electrolyte membrane (i.e., solid polymer membrane) formed of a single cation exchange membrane, and an anode and a cathode (i.e., electrodes) that sandwich the electrolyte membrane.

The anode and the cathode each include an electrically-conductive porous body, such as carbon paper, and a catalyst (such as Pt or Ru) held by the porous body and provided for causing an electrode reaction to occur in the anode and the cathode.

The separators have grooves for supplying hydrogen or air over the entire surfaces of the MEAs, and through-holes for feeding and draining hydrogen or air to and from all of the unit cells. These grooves and through-holes function as an anode flow path 112 (i.e., fuel-gas flow path) and a cathode flow path 113 (i.e., oxidant-gas flow path).

When hydrogen is supplied to each anode via the anode flow path 112, an electrode reaction corresponding to expression (1) occurs. When air is supplied to each cathode via the cathode flow path 113, an electrode reaction corresponding to expression (2) occurs. Thus, a potential difference (i.e., open circuit voltage (OCV)) is generated in each unit cell. Subsequently, when the fuel cell stack 110 is electrically connected to an external circuit, such as a motor 141, and electric current is retrieved therefrom, the fuel cell stack 110 generates electric power.

$$2H_2 \rightarrow 4H^+ + 4e^- \quad (1)$$

$$O_2 + 4H^+ + 4e^- \rightarrow 2H_2O \quad (2)$$

Cell Voltage Monitor

A cell voltage monitor 115 is a device that detects the cell voltage of each of the multiple unit cells 111 constituting the fuel cell stack 110, and includes a monitor body and a wire harness that connects the monitor body to each unit cell.

The monitor body scans all of the unit cells 111 in a predetermined cycle and detects the cell voltage of each unit cell 111 so as to calculate an average cell voltage and a minimum cell voltage. Then, the monitor body (i.e., cell voltage monitor 115) outputs the average cell voltage and the minimum cell voltage to the ECU 160.

Anode System

The anode system includes a hydrogen tank 121 (i.e., fuel-gas supply source), a normally-closed shut-off valve 122, a first injector 1 (i.e., first flow adjuster), a second injector 2 (i.e., second flow adjuster), an ejector 123, a check valve 124, a purge valve 125, and a pressure sensor 126. The first injector 1 is for small flow-rate ejection, whereas the second injector 2 is for large flow-rate ejection.

The hydrogen tank 121 is connected to an inlet of the anode flow path 112 via a pipe 121a, the shut-off valve 122, a pipe 122a, the first injector 1, a pipe 122b, the ejector 123, and a pipe 123a. The pipe 122a is connected to the pipe 123a via a pipe 122c, the second injector 2, and a pipe 122d. When hydrogen is ejected from the first injector 1 and/or the second injector 2 in a state where the shut-off valve 122 is open, the hydrogen in the hydrogen tank 121 is supplied to the anode flow path 112 via the pipe 121a and the like. A pressure reducing valve (regulator) (not shown) for reducing the pressure of the hydrogen is provided in the pipe 122a at a position upstream of a connection point between the pipe 122a and the pipe 122c.

A fuel-gas supply path connected to the inlet of the anode flow path 112 and through which the hydrogen to be supplied to the anode flow path 112 flows is constituted of the pipe 121a, the pipe 122a, the pipe 122b, and the pipe 123a. The ejector 123 is provided at a connection point between the fuel-gas supply path and a fuel-gas circulation path, to be described later, constituted of a pipe 124a and a pipe 124b.

The first injector 1 is provided in the fuel-gas supply path at a position upstream of the aforementioned connection point (of the ejector 123). Furthermore, a bypass flow path connects a section of the fuel-gas supply path located upstream of the first injector 1 to a section of the fuel-gas supply path located downstream of the ejector 123. The bypass flow path is constituted of the pipe 122c and the pipe 122d and causes new hydrogen from the hydrogen tank 121 to bypass the first injector 1 and the ejector 123. The second injector 2 is provided in the bypass flow path.

The hydrogen tank 121 is filled with hydrogen at high pressure.

The shut-off valve 122 is, for example, an electromagnetic valve whose gate valve is opened and closed by a solenoid (i.e., actuator). The shut-off valve 122 opens and closes in accordance with a command from the ECU 160.

First Injector and Second Injector

The first injector 1 and the second injector 2 are electronically controlled by the ECU 160 so as to eject hydrogen intermittently.

The fuel cell stack 110 and/or a battery 144, to be described later, is/are power source or sources for the first injector 1, the second injector 2, the shut-off valve 122, a compressor 131, to be described later, and the like.

Because the first injector 1 and the second injector 2 substantially have the same configuration, the first injector 1 will be described in detail below, and components in the second injector 2 that are different therefrom will be indicated in parentheses. Furthermore, for the sake of convenience for providing a clear explanation, the right side and the left side in FIG. 2 will be defined as the front side and the rear side, respectively.

Figure 2:
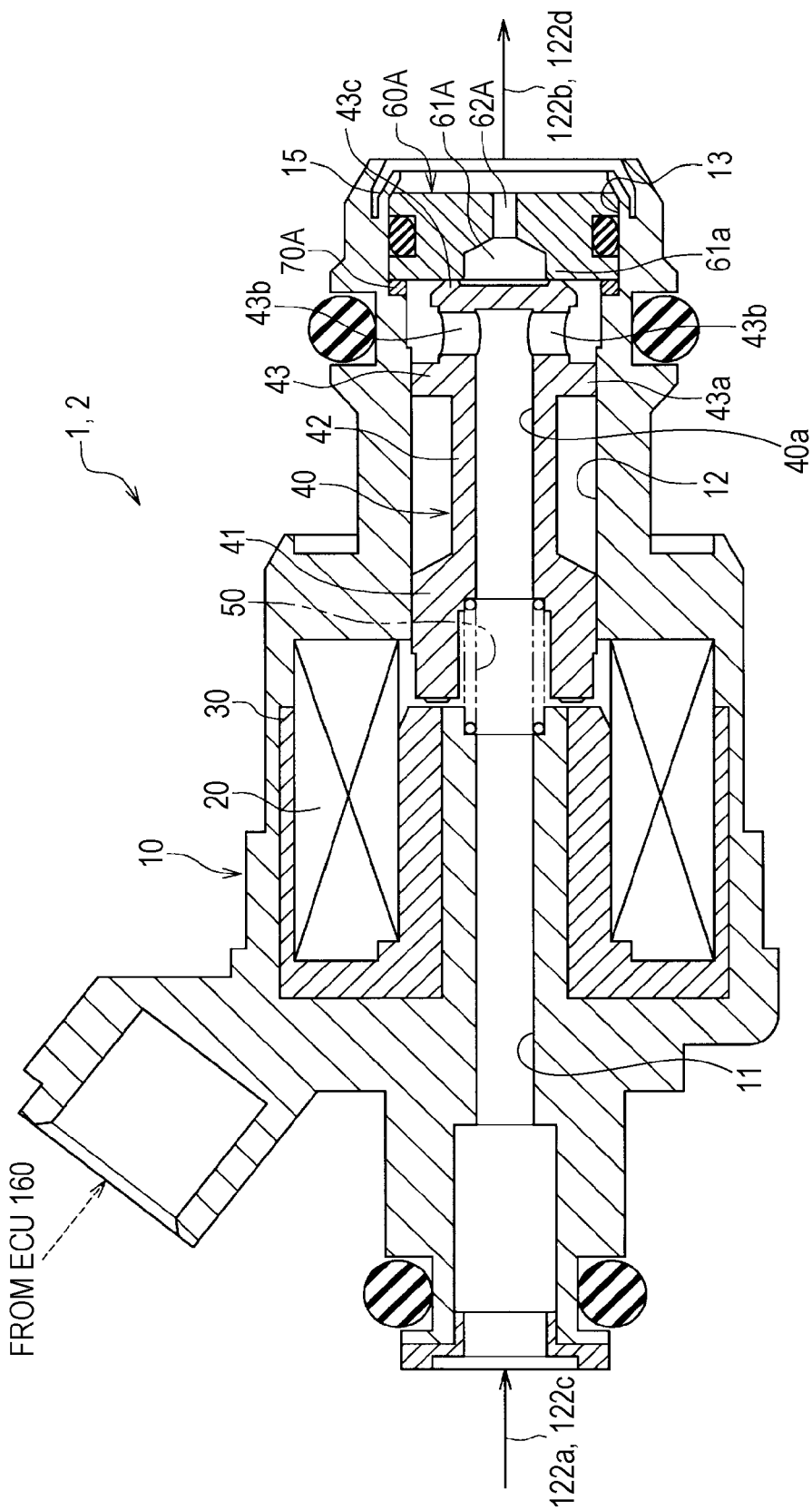
FIG. 2 is a cross-sectional view of a first injector (second injector)
Figure 3A:
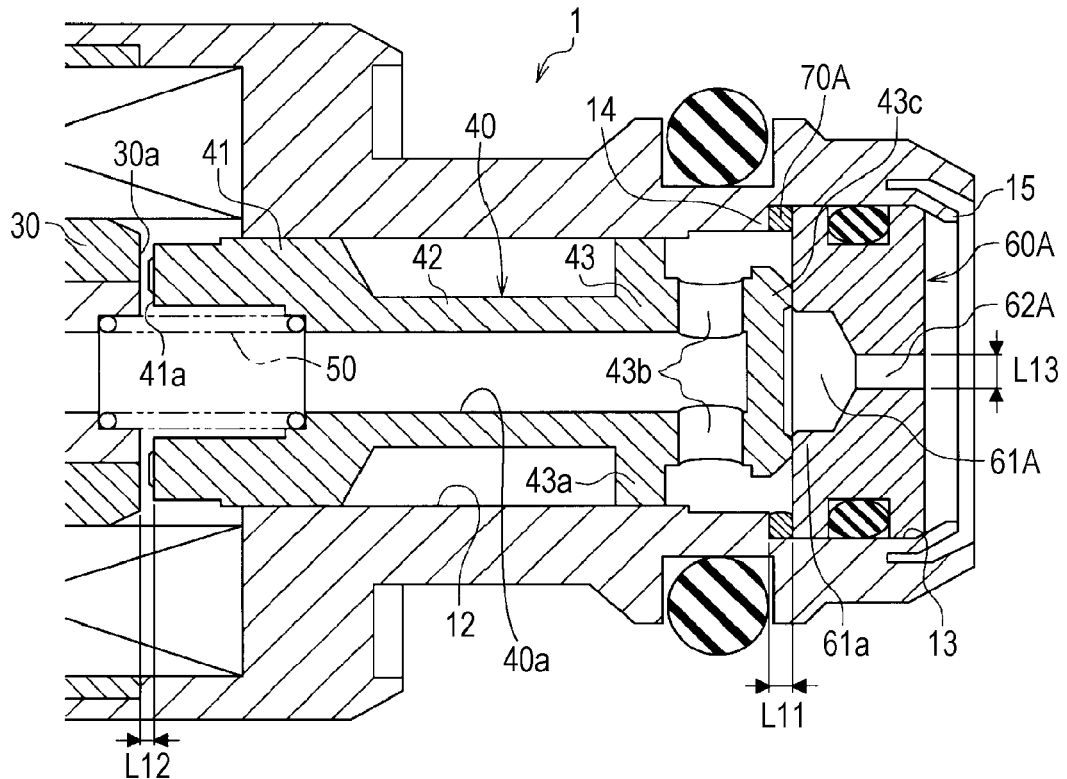
FIG. 3A is an enlarged cross-sectional view of the first injector.
Figure 3B:
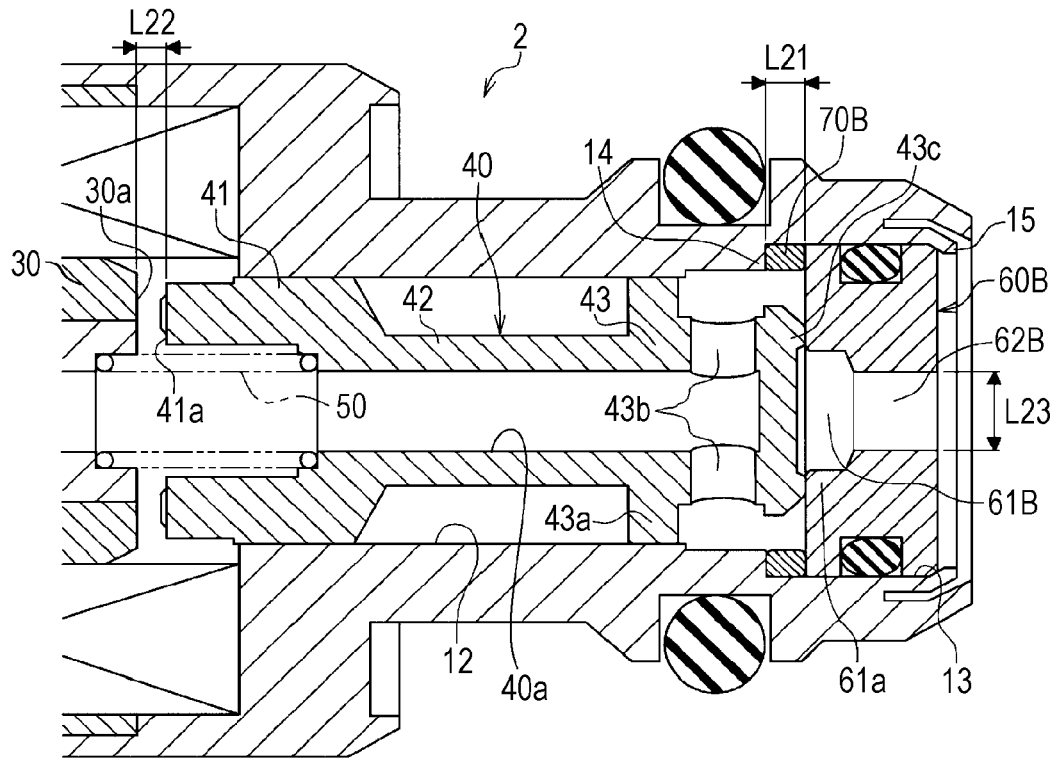
FIG. 3B is an enlarged cross-sectional view of the second injector.

As shown in FIG. 2 and FIG. 3A, the first injector 1 (see FIG. 3B for the second injector 2) includes a body 10, a solenoid 20, a fixed core 30, a plunger 40 (i.e., first driver or second driver), a compression coil spring 50, a nozzle 60A (nozzle 60B), and a shim 70A (shim 70B).

Body

The body 10 is a cylindrical component that has a flow path 11, a plunger chamber 12, and a nozzle chamber 13 on the central axis. The flow path 11 is a flow path through which the hydrogen from the pipe 122a (pipe 122c) flows. The plunger chamber 12 is a chamber having an increased diameter relative to the downstream end (i.e., front end) of the flow path 11 and accommodates the plunger 40 in a slidably movable manner. The nozzle chamber 13 is a chamber having an increased diameter relative to the front end of the plunger chamber 12 and accommodates the nozzle 60A. A step 14 formed where the diameter increases is in contact with the shim 70A (shim 70B).

Body and Fixed Core

The solenoid 20 and the fixed core 30 are contained in the body 10. When the solenoid 20 is supplied with electricity and is turned on in accordance with a command from the ECU 160, a magnetic force is generated in the fixed core 30, thereby pulling the plunger 40 thereto. The plunger 40 is formed of a magnetic material.

Plunger

The plunger 40 is a substantially cylindrical component and includes, from the rear side toward the front side, a base-end portion 41 that slides within the plunger chamber 12, a connection portion 42 formed at the front side of the base-end portion 41 and having a smaller diameter than the base-end portion 41, and a tip-end portion 43 formed at the front side of the connection portion 42. Specifically, the base-end portion 41 and the tip-end portion 43 are connected to each other via the connection portion 42. A flow path 40a having an opening at the rear side thereof is formed along the central axis of the plunger 40, such that hydrogen flows into the flow path 40a from the flow path 11.

The compression coil spring 50 is provided between the body 10 and the plunger 40, as viewed in the axial direction. The compression coil spring 50 biases the plunger 40 toward the front side (that is, toward the nozzle 60A).

The tip-end portion 43 is provided with a ring-shaped flange 43a that extends in the circumferential direction and also extends outward in the radial direction. An outer peripheral surface of the flange 43a is slidably in contact with an inner wall surface of the plunger chamber 12.

The tip-end portion 43 has a plurality of radially-extending communication holes 43b arranged in the circumferential direction. The flow path 40a and the plunger chamber 12 at the front side of the flange 43a spatially communicate with each other via the communication holes 43b.

A front surface of the tip-end portion 43 is provided with a ring-shaped seal portion 43c that protrudes toward the front side. When the solenoid 20 is turned off and the plunger 40 is moved forward by the compression coil spring 50, the seal portion 43c comes into contact with a valve seat 61a, to be described later, thereby shutting off the plunger chamber 12 at the front side of the flange 43a from a port 61A, to be described later. On the other hand, when the solenoid 20 is turned on and the plunger 40 is moved rearward by being pulled by the fixed core 30, the seal portion 43c moves away from the valve seat 61a so that the plunger chamber 12 at the front side of the flange 43a and the port 61A spatially communicate with each other, whereby hydrogen is ejected from the nozzle 60A.

Nozzle

The nozzle 60A is a disk-shaped component and is accommodated within the nozzle chamber 13. The body 10 that forms the nozzle chamber 13 is provided with a ring-shaped claw 15 having a spring force in the radial direction. The claw 15 is in contact with a front edge of the nozzle 60A (nozzle 60B).

Accordingly, even if the shim 70A (having a thickness L11) or the shim 70B (having a thickness L21, L11<L21, see FIG. 3B), which have different thicknesses, is interposed between the nozzle 60A (nozzle 60B) and the body 10 in the axial direction (i.e., front-rear direction), the claw 15 appropriately deforms so that the nozzle 60A (nozzle 60B) can be properly supported in the axial direction.

However, the configuration is not limited to the above. For example, a cylindrical cap that includes the claw 15 and extends helically around the body 10 may be provided. In this case, the cap and the body 10 may sandwich the nozzle 60A (nozzle 60B).

The nozzle 60A (nozzle 60B) has the aforementioned port 61A (port 61B) that extends continuously therethrough along the central axis, and an ejection hole 62A (ejection hole 62B). An edge along the rear opening of the port 61A serves as the valve seat 61a contactable with the seal portion 43c.

An inner diameter L13 of the ejection hole 62A in the first injector 1 is smaller than an inner diameter L23 of the ejection hole 62B in the second injector 2 (L13<L23). Thus, the flow rate of hydrogen ejected from the first injector 1 is smaller than the flow rate of hydrogen ejected from the second injector 2.

Shim

The shim 70A (shim 70B) is a ring-shaped component that positions the nozzle 60A (nozzle 60B) in the axial direction relative to the body 10, and also sets the stroke of the first injector 1 (second injector 2).

The thickness L11 of the shim 70A is smaller than (for example, ½) the thickness L21 of the shim 70B (L11<L21). Thus, with reference to the step 14 of the body 10, the nozzle 60B is disposed toward the front side relative to the nozzle 60A in the axial direction. Therefore, a stroke L12 of the first injector 1 (i.e., distance between the fixed core 30 and the plunger 40 when the solenoid 20 is turned off, see FIG. 3A) is smaller than a stroke L22 (see FIG. 3B) of the second injector 2 (L12<L22). Accordingly, the first injector 1 with the small stroke L12 provides a small flow rate, whereas the second injector 2 with the large stroke L22 provides a large flow rate.

A first suppliable range, which is a hydrogen suppliable range by the first injector 1, is set so as to include a hydrogen flow rate required by the fuel cell stack 110 when performing an electric-power generation process stably during steady operation in which load fluctuations (i.e., fluctuations in requested electric power) are small. In other words, the first injector 1 is not configured to eject hydrogen in a wide range of flow rates in correspondence with all required hydrogen flow rates, but has the small stroke L12 and the small nozzle diameter (i.e., inner diameter L23 of ejection hole 62B) so as to achieve reduced operating noise and vibration.

Figure 7:
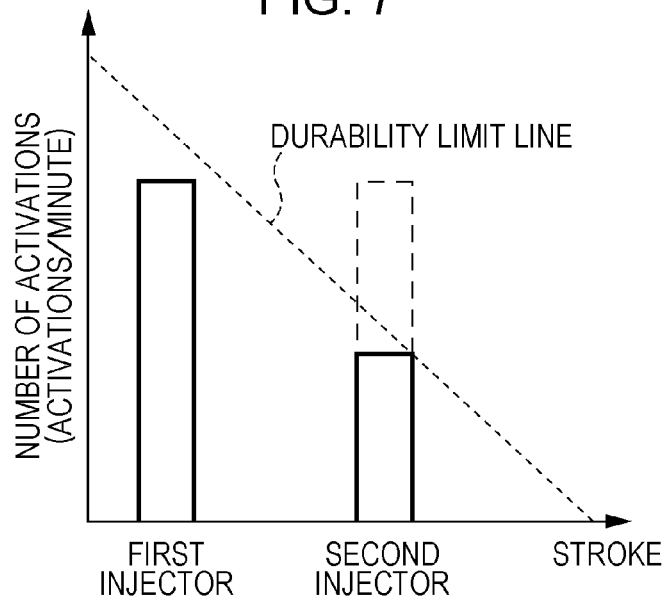
FIG. 7 is a graph illustrating the relationship between strokes of the first and second injectors and the number of activations thereof.

Furthermore, as shown in FIG. 7, based on the tendency that the maximum number of activations per a predetermined time period (activations/minute) needs to be reduced when the stroke increases so as to maintain predetermined durability, that is, to maintain the durability below a durability limit line, the stroke L12 and the maximum number of activations (i.e., upper limit for the first suppliable range) are set for the first injector 1.

On the other hand, since the stroke L22 of the second injector 2 is larger than that of the first injector 1, the maximum number of activations (activations/minute) thereof is smaller.

Mechanical Structure of First and Second Injectors

Since the first injector 1 and the second injector 2 differ from each other in terms of the nozzles 60A and 60B and the shims 70A and 70B, the two injectors respectively have the small flow-rate configuration and the large flow-rate configuration, regardless of the fact that other components including the plungers 40 (i.e., drivers) are identical. In other words, since identical components are used, the manufacturing costs of the first injector 1 and the second injector 2 are reduced.

Because the stroke L12 of the first injector 1 is smaller than (for example, ½) the stroke L22 of the second injector 2, stress, operating noise, and vibration generated between the plunger 40 and the fixed core 30 or the valve seat 61*a* (i.e., nozzle 60A) in the first injector 1 when the solenoid 20 is turned on and off are reduced. In other words, stress generated at a surface (i.e., stopper surface) of the plunger 40 facing the fixed core 30 and stress generated at a surface (i.e., seat surface) of the plunger 40 facing the nozzle 60A are reduced. Consequently, the first injector 1 is designed such that the durability thereof is higher than or equivalent to that of the second injector 2 even if the first injector 1 is activated more frequently than the second injector 2.

Since the first injector 1 is electronically controlled by the ECU 160, the first injector 1 has good responsiveness to a command (i.e., open command or close command) from the ECU 160, and thus has good controllability. Consequently, the pulsation characteristics (pressure fluctuations) of hydrogen are improved as the hydrogen is ejected and stopped, so that moisture (e.g., water vapor or condensation) accumulated in the anode flow path 112 can be readily pushed downstream, and negative pressure can be readily generated in the ejector 123, thereby improving the circulation of the hydrogen.

Likewise, since the second injector 2 is also electronically controlled by the ECU 160, the second injector 2 has good responsiveness to a command (i.e., open command or close command) from the ECU 160, and thus has good controllability. Consequently, the pulsation characteristics (i.e., pressure fluctuations) of hydrogen are improved as the hydrogen is ejected and stopped, so that moisture (e.g., water vapor or condensation) accumulated in the anode flow path 112 can be readily pushed downstream.

Ejector

The ejector 123 will now be described below with reference to FIG. 1.

The ejector 123 includes a nozzle 123*b* that ejects new hydrogen (i.e., hydrogen from the first injector 1) so as to generate negative pressure, and a diffuser 123*c* that mixes the new hydrogen with anode offgas suctioned from the pipe 124*b* (i.e., fuel-offgas circulation path) by the negative pressure and that supplies the mixture toward the pipe 123*a* (i.e., anode flow path 112).

An outlet of the anode flow path 112 is connected to an inlet of the ejector 123 via the pipe 124*a*, the check valve 124, and the pipe 124*b*. The anode offgas (i.e., fuel offgas) containing unconsumed hydrogen discharged from the anode flow path 112 is returned to the ejector 123 (i.e., fuel-gas supply path). Thus, the fuel-gas circulation path that circulates the hydrogen by returning the anode offgas discharged from the anode flow path 112 to the ejector 123 is constituted of the pipe 124*a* and the pipe 124*b*.

The check valve 124 is provided for preventing backflow of the anode offgas.

The pipe 124*a* is provided with a gas-liquid separator (not shown) that separates liquid-state moisture from the anode offgas.

An intermediate section of the pipe 124*a* is connected to a diluter 132, to be described later, via a pipe 125*a*, the purge valve 125, and a pipe 125*b*. The purge valve 125 is opened by the ECU 160 when purging impurities (such as water vapor and nitrogen) contained in the anode offgas circulating through the pipe 124*a* during an electric-power generation process in the fuel cell stack 110, or when replacing the inside of the anode flow path 112 with hydrogen during system activation.

The pressure sensor 126 is attached to the pipe 123*a*. The pressure sensor 126 detects the pressure inside the pipe 123*a* (which is substantially equal to the pressure in the anode flow path 112) and outputs the detected pressure to the ECU 160.

Cathode System

The cathode system includes the compressor 131 and the diluter 132.

An outlet of the compressor 131 is connected to an inlet of the cathode flow path 113 via a pipe 131*a*. When the compressor 131 is activated in accordance with a command from the ECU 160, the compressor 131 takes in oxygen-containing air and supplies the air to the cathode flow path 113 via the pipe 131*a*.

A humidifier (not shown) is provided so as to be bridged between the pipe 131*a* and a pipe 132*a*, to be described later. The humidifier has a moisture-permeable hollow fiber membrane and causes moisture exchange to occur between new air and highly-humid cathode offgas via the hollow fiber membrane so as to humidify the new air.

An outlet of the cathode flow path 113 is connected to the diluter 132 via the pipe 132*a*, so that the cathode offgas from the cathode flow path 113 is introduced into the diluter 132 via the pipe 132*a*.

The pipe 132*a* is provided with a back-pressure valve (not shown) that controls the back pressure thereof (i.e., pressure in the cathode flow path 113) in accordance with a command from the ECU 160.

The diluter 132 is a container that has a dilution chamber therein and mixes the anode offgas with the cathode offgas so as to dilute the hydrogen in the anode offgas with the cathode offgas (diluting gas). The diluted gas is discharged outward from the vehicle via a pipe 132*b*.

Power Control System

The power control system includes the motor 141, a power drive unit (PDU) 142, a power controller 143, and the battery 144. The motor 141 is connected to an output terminal (not shown) of the fuel cell stack 110 via the PDU 142 and the power controller 143, and the battery 144 is connected to the power controller 143. Specifically, the motor 141 and the battery 144 are parallel-connected to the power controller 143 (i.e., fuel cell stack 110).

The motor 141 is an electric motor that generates a driving force for driving the fuel-cell vehicle.

The PDU 142 is an inverter that converts direct-current power from the power controller 143 into three-phase alternating-current power in accordance with a command from the ECU 160 and supplies the power to the motor 141.

The power controller 143 has a first function for controlling the outputs (i.e., generated electric power, current value, and voltage value) from the fuel cell stack 110 in accordance with a command from the ECU 160, and a second function for controlling the charging and discharging of the battery 144 in accordance with a command from the ECU 160. The power controller 143 is constituted of various kinds of electronic circuits, such as a DC-DC chopper circuit.

The battery 144 is an electric storage device that charges and discharges electric power, and is, for example, an assembled battery constituted of a combination of multiple lithium-ion electric cells.

Other Devices

An IG 151 is a switch for activating the fuel cell system 100 (i.e., fuel-cell vehicle) and is provided in the vicinity of the driver seat. The IG 151 is connected to the ECU 160, and the ECU 160 detects an ON signal (i.e., system activation signal) and an OFF signal (i.e., system termination signal) of the IG 151.

An accelerator opening sensor 152 detects an amount by which the accelerator pedal (not shown) is pressed, which will be referred to as "accelerator opening degree" hereinafter. The accelerator opening sensor 152 outputs the accelerator opening degree to the ECU 160.

ECU

The ECU 160 is a controller that electronically controls the fuel cell system 100 and includes a central processing unit (CPU), a read-only memory (ROM), a random access memory (RAM), various kinds of interfaces, and an electronic circuit. The ECU 160 controls various kinds of devices and executes various kinds of processing in accordance with programs stored therein.

System Control Function of ECU During Activation

When the ON signal (i.e., system activation signal) of the IG 151 is detected, the ECU 160 opens the shut-off valve 122 so as to supply new hydrogen to the anode flow path 112, and also activates the compressor 131 so as to supply air to the cathode flow path 113. Subsequently, the ECU 160 controls the power controller 143 so as to cause the fuel cell stack 110 to generate electric power.

In this case, the ECU 160 appropriately controls the first injector 1 and the second injector 2. Moreover, until the electric-power generation process in the fuel cell stack 110 becomes stable, the ECU 160 intermittently opens the purge valve 125 multiple times so as to quickly replace the inside of the anode flow path 112 with hydrogen, thereby quickly increasing the hydrogen concentration therein.

Figure 8:
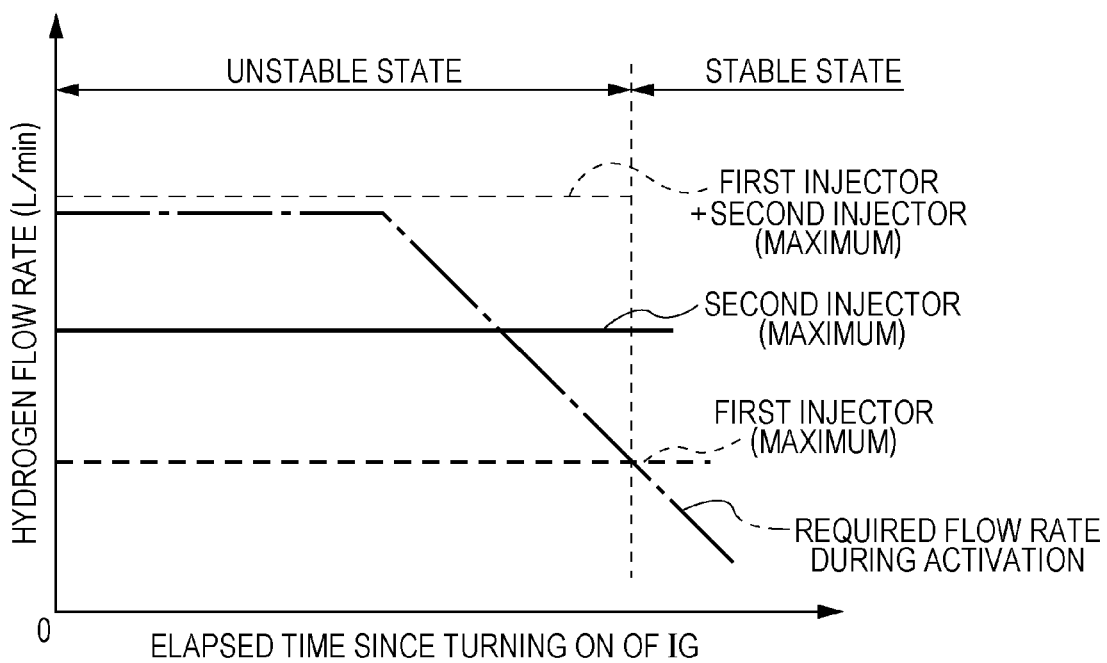
FIG. 8 is a graph illustrating the relationship between a time period elapsed since an IG is turned on and the hydrogen flow rate.

Furthermore, as shown in FIG. 8, a required hydrogen flow rate required by the fuel cell stack 110 during system activation tends to decrease gradually after the flow rate is maintained at a constant value since the turning on of the IG 151. A time chart in FIG. 8 is obtained from preliminary tests and illustrates an example where an idle state continues without any change in the requested electric power.

A maximum hydrogen flow rate corresponding to a case where the first injector 1 and the second injector 2 are both activated is set so as to exceed the required hydrogen flow rate during activation. Until the required hydrogen flow rate during activation becomes smaller than or equal to a maximum hydrogen flow rate corresponding to when the first injector 1 is used alone, the electric-power generation process in the fuel cell stack 110 is determined as being unstable, and therefore, the first injector 1 and the second injector 2 are both used. In other words, it is determined that the electric-power generation process is unstable until the required hydrogen flow rate during activation becomes smaller than or equal to the maximum flow rate of the first injector 1. When the required hydrogen flow rate during activation becomes smaller than or equal to the maximum flow rate, it is determined that the electric-power generation process is stable.

Stable-state Determining Function of ECU

The timing at which the electric-power generation process changes from an unstable state to a stable state is determined based on preliminary tests, and is stored in advance in the ECU 160. The ECU 160 (i.e., stable-state determiner) has a function of determining whether the electric-power generation process is unstable or stable during system activation on the basis of the aforementioned timing and a time period elapsed since the IG 151 is turned on.

As a first alternative, for example, it may be determined that the electric-power generation process is stable when the minimum cell voltage and the average cell voltage input from the cell voltage monitor 115 are larger than or equal to a predetermined voltage at which the electric-power generation process is determined as being stable. In other words, if the minimum cell voltage and the average cell voltage are not larger than or equal to the predetermined voltage, it may be determined that the electric-power generation process is unstable due to the occurrence of flooding in the fuel cell stack 110. As a second alternative, the hydrogen concentration may be detected by using a hydrogen sensor. In that case, when the hydrogen concentration in the anode flow path 112 reaches a predetermined hydrogen concentration or greater, the hydrogen replacement may be terminated, and it may be determined that the electric-power generation process is stable.

System Control Function of ECU During Termination

When the OFF signal (i.e., system termination signal) of the IG 151 is detected, the ECU 160 closes the shut-off valve 122 and stops the compressor 131, and also controls the power controller 143 so as to stop the electric-power generation process in the fuel cell stack 110.

If it is determined that the fuel cell stack 110 may possibly freeze when the IG 151 is turned off (i.e., when the system is stopped), the compressor 131 is activated by using the battery 144 as a power source. By using scavenging gas (i.e., dry air) ejected from the compressor 131, moisture (such as condensation) accumulated in the anode flow path 112 and the cathode flow path 113 is pushed outward, thereby scavenging the fuel cell stack 110. The scavenging gas is supplied to the anode flow path 112 via a pipe (not shown) that connects the pipe 131a and the pipe 123a.

Injector Control Function of ECU

The ECU 160 (i.e., injector controller) has a function of controlling the first injector 1 and the second injector 2 based on pulse-width modulation (PWD). Specifically, the ECU 160 has a function of controlling the amount of hydrogen to be ejected (i.e., flow rate) from the injectors and the flow rate (i.e., total flow rate) of hydrogen to be supplied to the anode flow path 112 by changing the ratio between the open command (i.e., open time period, ON duty) and the close command (i.e., closed time period, OFF duty) to be output to the first injector 1 and the second injector 2 within a specific basic time period (see FIG. 9 to FIG. 11).

Requested-Electric-power Calculating Function of ECU

The ECU 160 (i.e., requested-electric-power calculator) has a function of calculating requested electric power to be generated in and requested to the fuel cell stack 110 from the motor 141 (i.e., load) on the basis of the accelerator opening degree input from the accelerator opening sensor 152. The requested electric power increases with increasing accelerator opening degree, and a map regarding this relationship is obtained from preliminary tests and is stored in advance in the ECU 160.

Required-hydrogen-flow-rate Calculating Function of ECU

Figure 5:
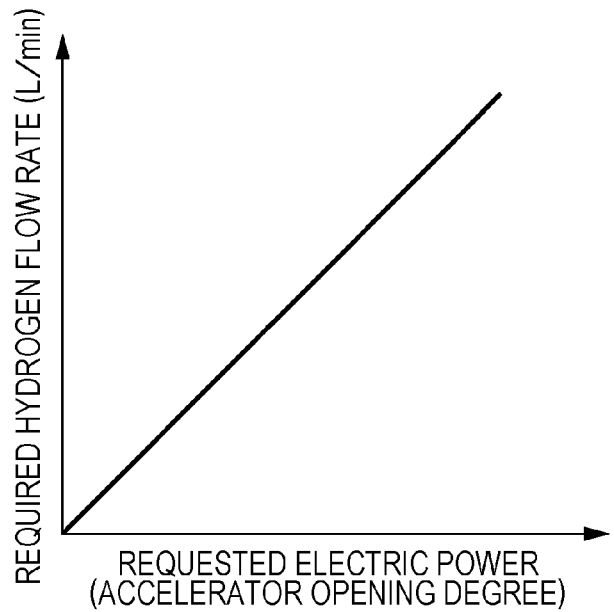
FIG. 5 is a map illustrating the relationship between requested electric power (i.e., accelerator opening degree) and a required hydrogen flow rate.

The ECU 160 (i.e., required-hydrogen-flow-rate calculator) has a function of calculating a required hydrogen flow rate (L/min) required by the fuel cell stack 110 for properly generating electric power to meet the requested electric power on the basis of the requested electric power and a map shown in FIG. 5. Specifically, the required hydrogen flow rate is set such that the fuel cell stack 110 contains an appropriate amount of hydrogen therein when it generates electric power to meet the requested electric power, thereby preventing a lack of hydrogen therein. The map in FIG. 5 is obtained from preliminary tests and is stored in advance in the ECU 160. As show in FIG. 5, the required hydrogen flow rate increases with increasing requested electric power (i.e., accelerator opening degree).

First Supply Capability Determining Function of ECU

The ECU 160 (i.e., first supply capability determiner) has a function of determining whether or not the required hydrogen flow rate is within the first suppliable range in which the hydrogen can be sufficiently supplied by the small-flow-rate first injector 1 alone. The upper limit of the first suppliable range is set to, for example, the flow rate of hydrogen ejected from the first injector 1 when the first injector 1 is continuously opened, that is, when the ON duty to the first injector 1 is set at maximum and the OFF duty is set to zero. The upper limit of the first suppliable range is obtained from preliminary tests on the basis of the specifications of the first injector 1, such as the stroke L12, the inner diameter L13 of the ejection hole 62A, and the pressure of hydrogen input to the first injector 1, and is stored in advance in the ECU 160. The lower limit of the first suppliable range is zero.

Operational-state Determining Function of ECU

The ECU 160 (i.e., operational-state determiner) has a function of determining whether the operational state is steady or unsteady during system operation when the IG 151 is turned on.

The term "steady operational state" refers to a state in which the fuel-cell vehicle is running steadily at a substantially constant speed due to the accelerator pedal being maintained at a constant opening degree, and the requested electric power is fluctuating within a predetermined variation range. The predetermined variation range is dependent on the specifications (e.g., rated output, etc.) of the fuel cell stack 110 and the specifications (e.g., weight, etc.) of the fuel-cell vehicle, and is determined from preliminary tests. In detail, for example, if the amount of variation in the requested electric power from the present to three to ten seconds immediately thereafter is within the predetermined variation range, it is determined that the current operational state is steady.

In this case, the steady operational state includes a case where the fuel-cell vehicle is decelerating due to a decrease in the accelerator opening degree.

The term "unsteady operational state" refers to a transient period, such as when the vehicle starts running uphill or when the fuel-cell vehicle is accelerating due to an increase in the accelerator opening degree such that the requested electric power is fluctuating beyond the predetermined variation range. In detail, for example, if the amount of variation in the requested electric power from the present to three to ten seconds immediately thereafter exceeds the predetermined variation range, it is determined that the current operational state is unsteady.

Operation and Advantages of Fuel-cell System

Figure 4:
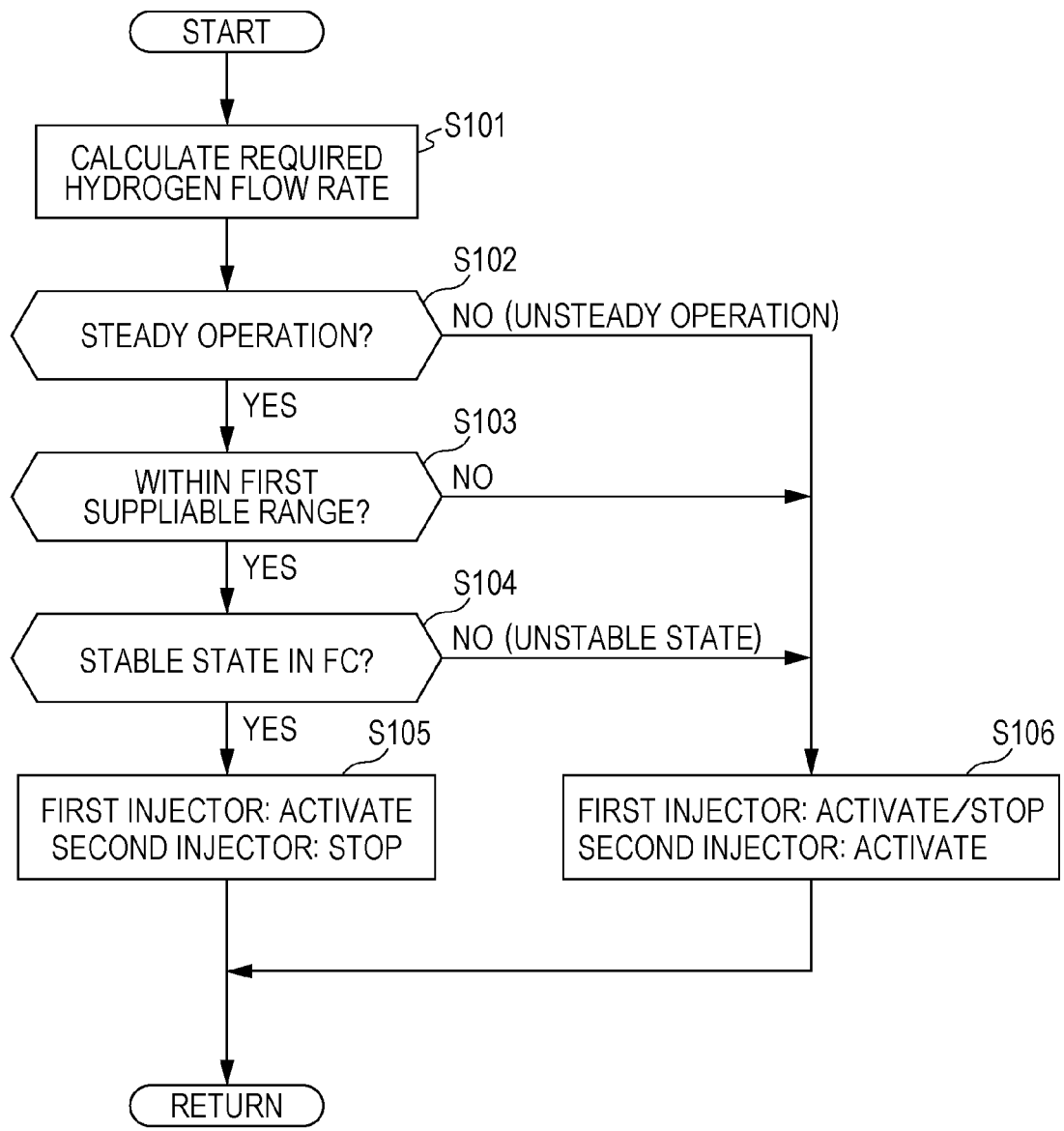
FIG. 4 is a flowchart illustrating operation of the fuel cell system according to the embodiment.

Next, the operation and advantages of the fuel cell system 100 will be described with reference to FIG. 4.

In the initial state, the IG 151 is turned on and the fuel cell stack 110 is supplied with hydrogen and air so that the fuel cell stack 110 generates electric power.

In step S101, the ECU 160 calculates requested electric power to be generated in and requested to the fuel cell stack 110 from the motor 141 (i.e., load) on the basis of the accelerator opening degree input from the accelerator opening sensor 152. The requested electric power increases with increasing accelerator opening degree.

Then, based on the requested electric power and the map in FIG. 5, the ECU 160 calculates a required hydrogen flow rate (L/min) required by the fuel cell stack 110 for properly generating electric power to meet the requested electric power.

In step S102, the ECU 160 determines whether or not the current operational state is steady. If it is determined that the current operational state is steady ("Yes" in step S102), the processing in the ECU 160 proceeds to step S103. On the other hand, if it is determined that the current operational state is not steady ("No" in step S102), that is, if it is determined that the current operational state is unsteady, the processing in the ECU 160 proceeds to step S106.

Figure 6:
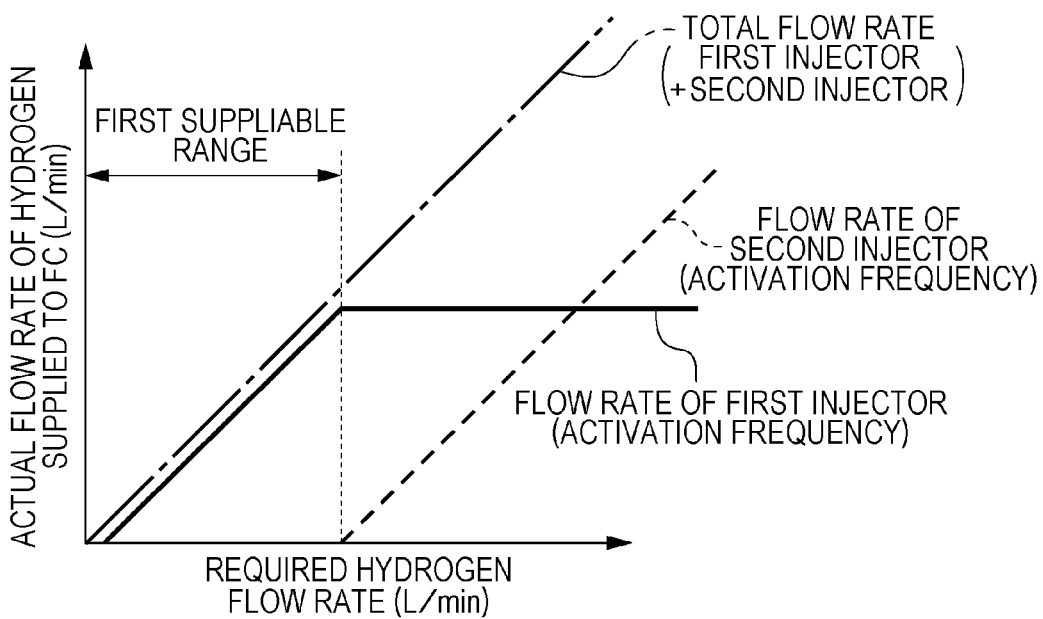
FIG. 6 is a map illustrating the relationship between the required hydrogen flow rate, the flow rate of hydrogen actually supplied to a fuel cell stack, the flow rate of hydrogen ejected from the first injector, the flow rate of hydrogen ejected from the second injector, and the total flow rate of hydrogen ejected from the first and second injectors.

In step S103, the ECU 160 determines whether or not the required hydrogen flow rate calculated in step S101 is within the first suppliable range in which the hydrogen can be sufficiently supplied by the first injector 1 alone (see FIG. 6).

If it is determined that the required hydrogen flow rate is within the first suppliable range ("Yes" in step S103), the processing in the ECU 160 proceeds to step S104. On the other hand, if it is determined that the required hydrogen flow rate is not within the first suppliable range ("No" in step S103), the processing in the ECU 160 proceeds to step S106.

In step S104, the ECU 160 determines whether or not the current electric-power generation process in the fuel cell stack 110 is stable. In this case, it is determined that the electric-power generation process is stable if the time elapsed since the turning on of the IG 151 is greater than or equal to a predetermined time period in which the electric-power generation process changes from the unstable state to the stable state shown in FIG. 8.

If it is determined that the electric-power generation process is stable ("Yes" in step S104), the processing in the ECU 160 proceeds to step S105. On the other hand, if it is determined that the electric-power generation process is not stable ("No" in step S104), that is, if it is determined that the electric-power generation process is unstable, the processing in the ECU 160 proceeds to step S106.

In step S105, the ECU 160 only activates the first injector 1 so that the required hydrogen flow rate calculated in step S101 is achieved. Specifically, in order to achieve the required hydrogen flow rate, which is a target value, the ECU 160 calculates a duty ratio ((ON time period of solenoid 20)/(OFF time period of solenoid 20)) for the first injector 1, and controls the first injector 1 based on PWM in accordance with this duty ratio. In this case, the second injector 2 is stopped.

Accordingly, when the operational state is steady ("Yes" in step S102) and the required hydrogen flow rate is within the first suppliable range ("Yes" in step S103), the second injector 2 is stopped so that operating noise and vibration are not generated from the second injector 2. In addition, since the first injector 1 has a short stroke, operating noise and vibration occurring as the solenoid 20 is turned on and off are reduced.

Subsequently, the processing in the ECU 160 returns to "Start".

In step S106, the ECU 160 activates the small-flow-rate first injector 1 and/or the large-flow-rate second injector 2 so that the required hydrogen flow rate calculated in step S101 is achieved. This will be described later.

Unsteady Operational State ("No" in Step S102)

If the processing proceeds to step S106 due to the operational state being unsteady ("No" in step S102) (such as during a transient period when the fuel-cell vehicle suddenly accelerates or when the vehicle starts running uphill), the ECU 160 causes the first injector 1 to mainly eject hydrogen while also causing the second injector 2 to appropriately eject hydrogen so that the required hydrogen flow rate calculated in step S101 is achieved. Specifically, the second injector 2 is appropriately activated so as to assist with the supply of hydrogen. In this case, in order to cope with a sudden change in the requested electric power, the upper limit of the first suppliable range may be temporarily lowered so as to raise the activation frequency of the second injector 2.

Accordingly, when the operational state is unsteady, the second injector 2 is activated together with the first injector 1. Thus, the second injector 2 assists with the supply of hydrogen so as to prevent a lack of hydrogen in the fuel cell stack 110, thereby coping with a sudden change in the requested electric power and reliably responding to a load-requested amount. The term "load-requested amount" refers to an amount of electric power requested to the fuel cell stack 110 by the motor 141 serving as a load.

Furthermore, the first injector 1 does not need to be activated under conditions (such as the activation frequency) in which the durability thereof decreases. Thus, the durability of the first injector 1 can be increased, while reducing striking noise (the number of strikes) of the plunger 40 occurring as the first injector 1 is turned on and off.

When the first injector 1 and the second injector 2 are both used, it is preferable that the activation timings thereof be in synchronization with each other. Specifically, it is preferable that the second injector 2 be activated during the activation of the mainly-used first injector 1 (while the solenoid 20 thereof is being turned on) (see FIG. 9 to FIG. 11). By synchronizing the activation timings in this manner, the pulsation and pressure fluctuations of the hydrogen flowing through the anode flow path 112 become greater so that, for example, condensation accumulated in the anode flow path 112 can be properly discharged.

Figure 9:
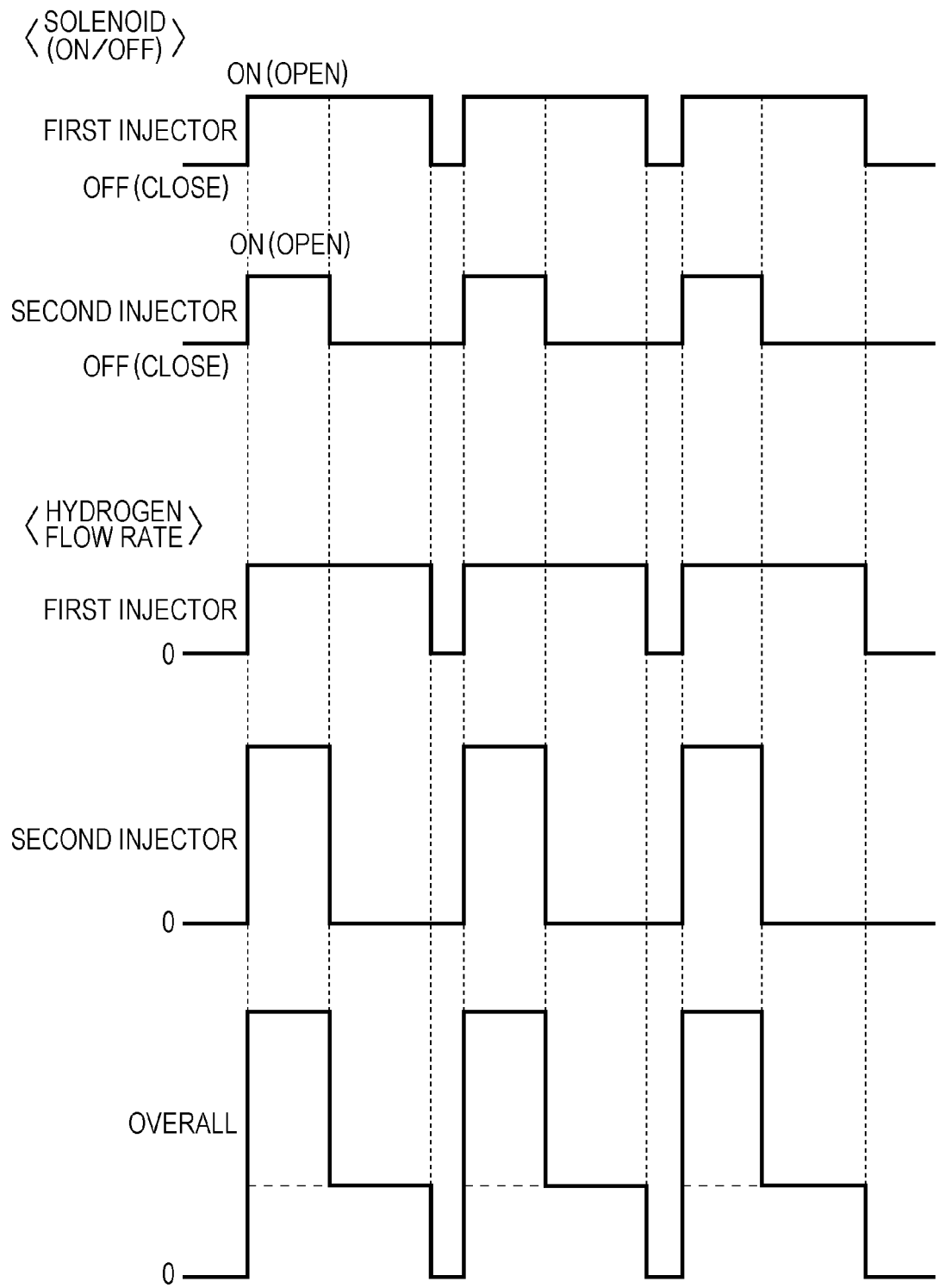
FIG. 9 is a time chart illustrating an example of operation performed in the fuel cell system according to the embodiment.

In this case, as shown in FIG. 9, it is preferable that the valves of the first injector 1 and the second injector 2 be opened (namely, the solenoids 20 thereof be turned on) at substantially the same time so that the control process of the first injector 1 and the second injector 2 can be simplified.

Figure 10:
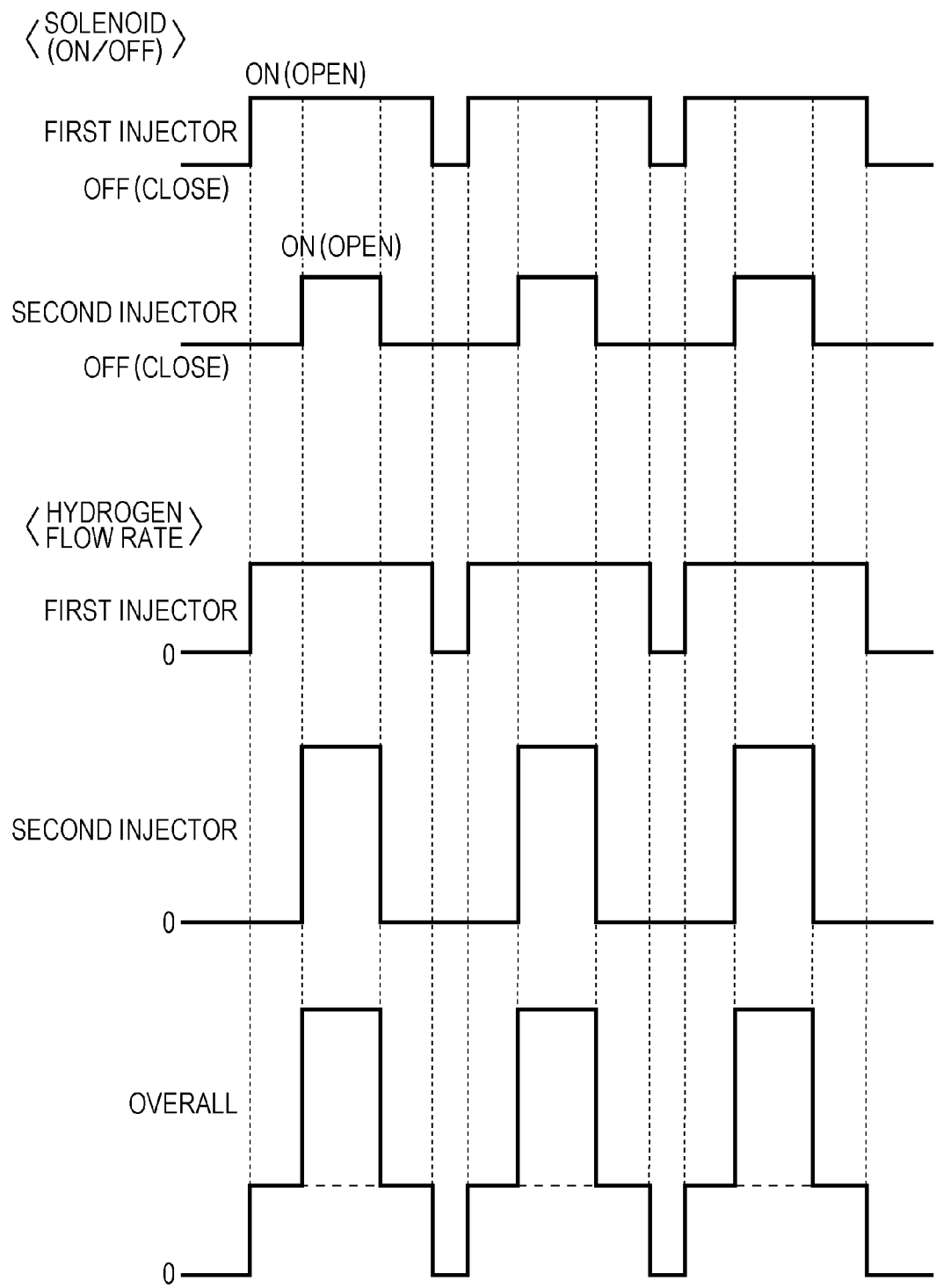
FIG. 10 is a time chart illustrating another example of operation performed in the fuel cell system according to the embodiment.
Figure 11:
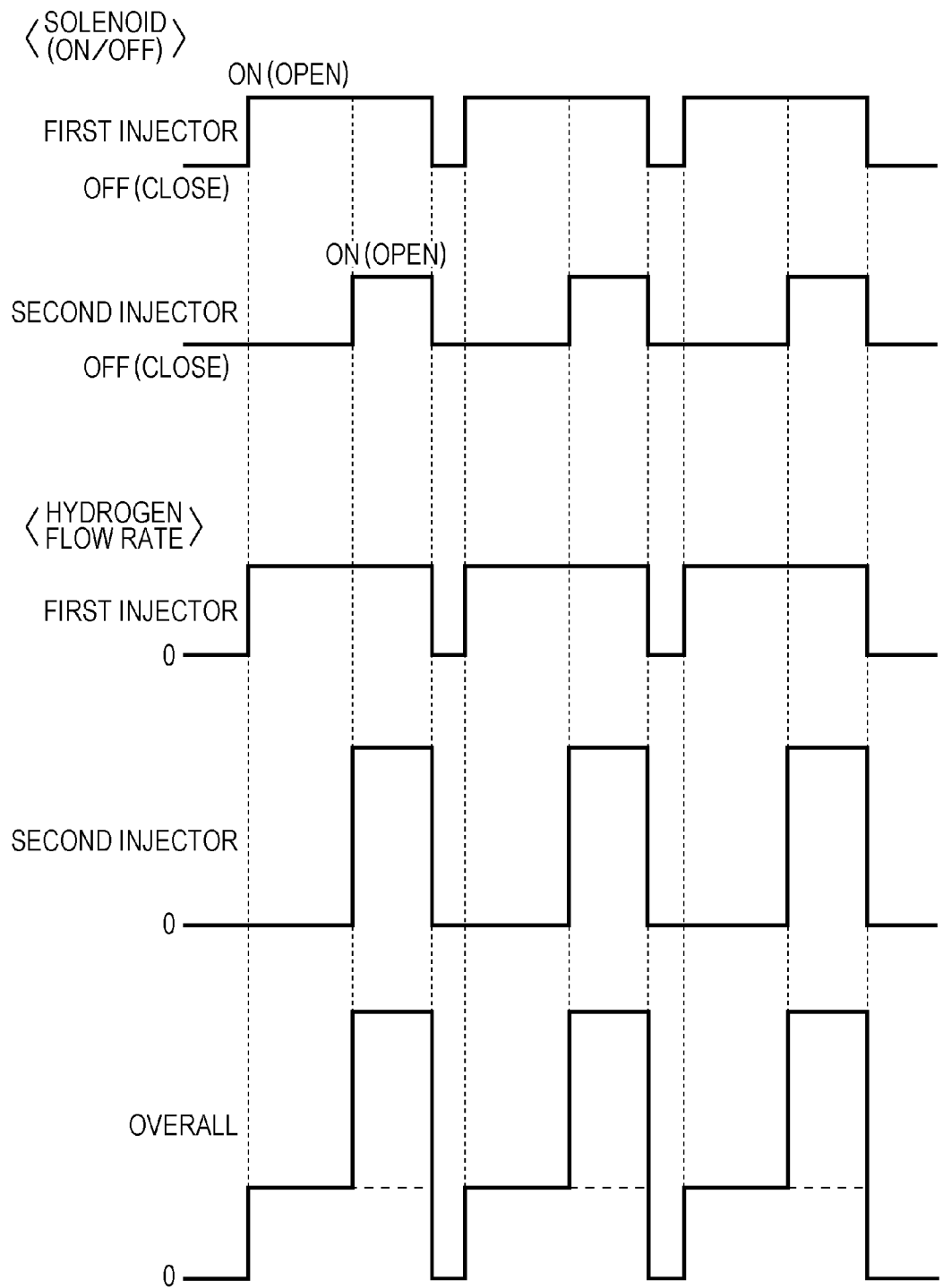
FIG. 11 is a time chart illustrating another example of operation performed in the fuel cell system according to the embodiment.

Alternatively, a configuration shown in FIG. 10 in which the second injector 2 is activated and stopped during the activation of the first injector 1 and a configuration shown in FIG. 11 in which the first injector 1 and the second injector 2 are closed at substantially the same time are also included in the technical scope of the present application.

Steady Operational State and Outside First Suppliable Range ("No" in Step S103)

If the processing proceeds to step S106 due to the operational state being steady ("Yes" in step S102) and the required hydrogen flow rate being outside the first suppliable range ("No" in step S103) (such as during high-speed cruising), the ECU 160 causes the first injector 1 to mainly eject hydrogen while also activating the second injector 2 so as to assist with the supply of hydrogen exceeding the first suppliable range, so that the required hydrogen flow rate calculated in step S101 can be achieved. Consequently, an appropriate amount of hydrogen is supplied to the fuel cell stack 110, whereby the fuel cell stack 110 can properly generate electric power.

As mentioned above, it is preferable that the activation timings of the first injector 1 and the second injector 2 be in synchronization with each other.

Unstable State ("No" in Step S104)

When the results obtained in step S102, step S103, and step S104 are "Yes", "Yes", and "No", respectively, and the processing proceeds to step S106 due to the current electric-power generation process being unstable, at least the large-flow-rate second injector 2 is activated so that the required hydrogen flow rate calculated in step S101 is achieved. Specifically, the second injector 2 is activated with higher priority over the first injector 1. Consequently, new hydrogen can be supplied at a large flow rate to the anode flow path 112 so that the hydrogen concentration in the anode flow path 112 can be quickly increased, thereby quickly performing the hydrogen replacement and changing the electric-power generation process from the unstable state to a stable state at an early stage.

As mentioned above, it is preferable that the activation timings of the first injector 1 and the second injector 2 be in synchronization with each other.

Subsequently, the processing in the ECU 160 returns to "Start".

Modifications

Although the embodiment of the present application has been described above, the present application is not limited to the above embodiment. For example, the present application may be modified as follows.

Although the first flow adjuster is configured by the first injector 1 in the above embodiment, the first flow adjuster may alternatively be configured by, for example, intermittently opening and closing a generally-known electromagnetic valve (on-off valve), such as a gate valve or a ball valve. The same applies to the second flow adjuster.

Although the fuel cell system 100 installed in the fuel-cell vehicle is described as an example in the above embodiment, the application location is not limited to the above. For example, the system may be incorporated in a stationary fuel cell system.

According to an aspect of the embodiment, a fuel cell system includes a fuel cell, a fuel-gas supply path, a fuel-gas circulation path, a first flow adjuster, an ejector, a bypass flow path, and a second flow adjuster. The fuel cell has a fuel-gas flow path and an oxidant-gas flow path. The fuel-gas supply path is connected to an inlet of the fuel-gas flow path. Fuel gas to be supplied to the fuel-gas flow path flows through this fuel-gas supply path. The fuel-gas circulation path connects an outlet of the fuel-gas flow path to the fuel-gas supply path and circulates the fuel gas by returning fuel offgas discharged from the fuel-gas flow path to the fuel-gas supply path. The first flow adjuster is provided in the fuel-gas supply path at a position upstream of a connection point between the fuel-gas supply path and the fuel-gas circulation path and adjusts a flow rate of the fuel gas by intermittently ejecting the fuel gas. The ejector is provided at the connection point between the fuel-gas supply path and the fuel-gas circulation path and generates negative pressure by ejecting the fuel gas from the first flow adjuster via a nozzle. The ejector mixes the fuel gas with the fuel offgas by suctioning the fuel offgas from the fuel-gas circulation path by utilizing the negative pressure. The bypass flow path connects a section of the fuel-gas supply path located upstream of the first flow adjuster to a section of the fuel-gas supply path located downstream of the ejector so as to cause the fuel gas to bypass the first flow adjuster and the ejector. The second flow adjuster is provided in the bypass flow path and adjusts the flow rate of the fuel gas by intermittently ejecting the fuel gas at a larger flow rate than the first flow adjuster.

With this configuration of the embodiment, if the required fuel-gas flow rate required by the fuel cell is large to an extent that the flow rate of fuel gas supplied to the fuel cell is insufficient with the first flow adjuster alone, the second flow adjuster assists with the supply of fuel gas by intermittently ejecting the fuel gas at a larger flow rate than the first flow adjuster. The fuel gas from the second flow adjuster bypasses the first flow adjuster and the ejector by flowing through the bypass flow path so as to be supplied to the fuel cell, thereby preventing a lack of fuel gas in the fuel cell. Consequently, the fuel cell can generate electric power in correspondence with a request (i.e., load-requested amount or requested electric power) from an external unit (i.e., load).

Specifically, if the required fuel-gas flow rate is large, the second flow adjuster may appropriately eject the fuel gas so that the small-flow-rate first flow adjuster does not need to operate under conditions (i.e., stroke and activation frequency) in which the durability thereof significantly decreases. Consequently, operating noise (striking noise of a plunger) and vibration in the first flow adjuster can be reduced while increasing the durability of the first flow adjuster.

Furthermore, it is preferable that the aforementioned fuel cell system of the embodiment further include a controller that controls the first flow adjuster and the second flow adjuster; an operational-state determiner that determines whether an operational state is a steady operational state in which requested electric power to be generated in the fuel cell fluctuates within a predetermined variation range or an unsteady operational state in which the requested electric power fluctuates beyond the predetermined variation range (such as when a fuel-cell vehicle is accelerating or starts running uphill in an embodiment to be described below); a required-fuel-gas-flow-rate calculator that calculates a required fuel-gas flow rate on the basis of the requested electric power; and a first supply capability determiner that determines whether or not the required fuel-gas flow rate calculated by the required-fuel-gas-flow-rate calculator is within a first suppliable range of the first flow adjuster. When the operational-state determiner determines that the operational state is steady and the first supply capability determiner determines that the required fuel-gas flow rate calculated by the required-fuel-gas-flow-rate calculator is within the first suppliable range, the controller may only control the first flow adjuster. When the operational-state determiner determines that the operational state is unsteady, the controller may control the second flow adjuster in correspondence with the required fuel-gas flow rate.

With this configuration of the embodiment, when the operational-state determiner determines that the operational state is steady and the first supply capability determiner determines that the required fuel-gas flow rate calculated by the required-fuel-gas-flow-rate calculator is within the first suppliable range, the controller only controls the first flow adjuster. Consequently, the first flow adjuster alone is properly controlled without having to additionally activate the second flow adjuster, so that an appropriate amount of fuel gas corresponding to the requested electric power can be supplied to the fuel cell.

Since the first suppliable range of the first flow adjuster can be limited within a variation range of the fuel-gas flow rate in the steady operational state, for example, the upper limit for the amount of fuel gas ejected by the first flow adjuster does not need to be increased to an excessively high value, and the first flow adjuster does not need to be controlled in a range in which the durability thereof is significantly reduced.

On the other hand, when the operational-state determiner determines that the operational state is unsteady, the controller controls the second flow adjuster in correspondence with the required fuel-gas flow rate so that, for example, the second flow adjuster is activated to assist with the supply of fuel gas by ejecting the fuel gas in correspondence with an amount by which the required fuel-gas flow rate exceeds the first suppliable range. With this configuration, a lack of fuel gas in the fuel cell is prevented, whereby the fuel cell can properly generate electric power in correspondence with the requested electric power.

Furthermore, it is preferable that the aforementioned fuel cell system of the embodiment further include a stable-state determiner that determines whether an electric-power generation process in the fuel cell is in a stable state. When the stable-state determiner determines that the electric-power generation process is not in the stable state, the controller preferably controls at least the second flow adjuster regardless of a determination result of the first supply capability determiner.

With this configuration of the embodiment, the fuel gas can be supplied at a large flow rate to the fuel-gas flow path, thereby quickly increasing the fuel-gas concentration in the fuel-gas flow path and replacing the inside of the fuel-gas flow path with the fuel gas at an early stage. Consequently, the electric-power generation process can be changed from the unstable state to the stable state at an early stage.

The following are three examples of cases where the stable-state determiner determines that the electric-power generation process is in the stable state. In the first example, in a case where the fuel cell is a fuel cell stack constituted of a stack of multiple unit cells, the stable-state determiner may determine that the electric-power generation process is in the stable state if a minimum cell voltage or an average cell voltage of the multiple unit cells is larger than or equal to a predetermined voltage. In the second example, the stable-state determiner may determine that the electric-power generation process is in the stable state if it is determined that fuel-gas replacement is completed due to the fuel-gas concentration in the fuel-gas flow path being greater than or equal to a predetermined fuel-gas concentration value. In the third example, the stable-state determiner may determine that the electric-power generation process is in the stable state if a predetermined time period has elapsed since activation of the system.

Since the electric-power generation process tends to become unstable during system activation, the electric-power generation process can be changed to the stable state at an early stage by controlling at least the large-flow-rate second flow adjuster in this manner.

Furthermore, in the aforementioned fuel cell system of the embodiment, when the first flow adjuster and the second flow adjuster are to be activated, activation timings of the first flow adjuster and the second flow adjuster are preferably in synchronization with each other.

With this configuration of the embodiment, the fuel gas is ejected from the first flow adjuster and the second flow adjuster at the same time.

Consequently, the total flow rate of fuel gas from the first flow adjuster and the second flow adjuster reaches the maximum so that the pulsation of the flowing fuel gas becomes greater, resulting in increased pressure fluctuations. Therefore, even if condensation or the like is produced in the fuel-gas flow path due to flooding occurring in the fuel cell, the condensation or the like can be properly discharged from the fuel-gas flow path (i.e., fuel cell) by the fuel gas having the large pulsation and large pressure fluctuations.

Furthermore, in the aforementioned fuel cell system of the embodiment, when the first flow adjuster and the second flow adjuster are to be activated, the fuel gas is preferably ejected from the first flow adjuster and the second flow adjuster at substantially the same time.

With this configuration of the embodiment, the control process of the first flow adjuster and the second flow adjuster is simplified.

Furthermore, since the first flow adjuster and the second flow adjuster eject the fuel gas at substantially the same time after the flow rate and the pressure of pre-ejected fuel gas are in a minimum state, the pulsation of the flowing fuel gas reaches the maximum, that is, the pressure fluctuations reach the maximum, whereby condensation or the like can be quickly discharged from the fuel-gas flow path (i.e., fuel cell).

Furthermore, in the aforementioned fuel cell system of the embodiment, it is preferable that the first flow adjuster be an electronically-controlled first injector.

With this configuration of the embodiment, the first flow adjuster has good responsiveness to a command (i.e., open command or close command), and thus has good controllability. Moreover, since the pulsation and pressure fluctuations of the fuel gas as the fuel gas is ejected and stopped become greater, the discharging of condensation or the like from the fuel-gas flow path is improved. In addition, because negative pressure can be readily generated in the ejector, the circulation of the fuel gas is also improved.

Furthermore, in the aforementioned fuel cell system of the embodiment, it is preferable that the second flow adjuster be an electronically-controlled second injector.

With this configuration of the embodiment, the second flow adjuster has good responsiveness to a command (i.e., open command or close command), and thus has good controllability. Moreover, since the pulsation and pressure fluctuations of the fuel gas as the fuel gas is ejected and stopped become greater, the discharging of condensation or the like from the fuel-gas flow path is improved.

Furthermore, in the aforementioned fuel cell system of the embodiment, a first driver of the first injector and a second driver of the second injector are preferably identical components, and a first stroke of the first driver is preferably smaller than a second stroke of the second driver.

With this configuration of the embodiment, the manufacturing costs of the first injector and the second injector can be reduced.

According to the embodiment, a fuel cell system that allows for increased durability of a flow adjuster, such as an injector, while also achieving reduced operating noise and vibration of the flow adjuster can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
a fuel cell having a fuel-gas flow path and an oxidant-gas flow path;
a fuel-gas supply path which is connected to an inlet of the fuel-gas flow path and through which fuel gas to be supplied to the fuel-gas flow path flows;
a fuel-gas circulation path connecting an outlet of the fuel-gas flow path to the fuel-gas supply path to circulate the fuel gas by returning fuel offgas discharged from the fuel-gas flow path to the fuel-gas supply path, the fuel-gas supply path and the fuel-gas circulation path being connected with each other at a connection point;
a first injector provided in the fuel-gas supply path at a position upstream of the connection point to adjust a flow rate of the fuel gas by intermittently ejecting the fuel gas, the first injector including a first nozzle;
an ejector provided at the connection point to generate negative pressure by ejecting the fuel gas from the first injector via the first nozzle, the ejector being provided to mix the fuel gas with the fuel offgas by suctioning the fuel offgas from the fuel-gas circulation path using the negative pressure;
a bypass flow path connecting an upstream section of the fuel-gas supply path located upstream of the first injector to a downstream section of the fuel-gas supply path located downstream of the ejector so as to cause the fuel gas to bypass the first injector and the ejector;
a second injector provided in the bypass flow path to adjust the flow rate of the fuel gas by intermittently ejecting the fuel gas, the second injector including a second nozzle;
a controller configured to control the first flow adjuster and the second flow adjuster;
an operational-state determiner configured to determine whether an operational state of the fuel cell system is one of
 a steady operational state in which requested electric power to be generated in the fuel cell fluctuates within a predetermined variation range, and
 an unsteady operational state in which the requested electric power fluctuates beyond the predetermined variation range;
a required-fuel-gas-flow-rate calculator configured to calculate a required fuel-gas flow rate based on the requested electric power; and
a first supply capability determiner configured to determine whether or not the required fuel-gas flow rate calculated by the required-fuel-gas-flow-rate calculator is within a first suppliable range of the first flow adjuster,
wherein if the operational-state determiner determines that the operational state is steady and if the first supply capability determiner determines that the required fuel-gas flow rate calculated by the required-fuel-gas-flow-rate calculator is within the first suppliable range, the controller only controls the first flow adjuster to eject the fuel gas, and
wherein if the operational-state determiner determines that the operational state is unsteady, the controller controls the first and second flow adjusters in correspondence with the required fuel-gas flow rate,
further comprising:
 a stable-state determiner configured to determine whether an electric-power generation process in the fuel cell is in a stable state,
wherein if the stable-state determiner determines that the electric-power generation process is not in the stable state, the controller controls at least the second flow adjuster regardless of a determination result of the first supply capability determiner.

2. A fuel cell system comprising:
a fuel cell having a fuel-gas flow path and an oxidant-gas flow path;
a fuel-gas supply path which is connected to an inlet of the fuel-gas flow path and through which fuel gas to be supplied to the fuel-gas flow path flows;
a fuel-gas circulation path connecting an outlet of the fuel-gas flow path to the fuel-gas supply path to circulate the fuel gas by returning fuel offgas discharged from the fuel-gas flow path to the fuel-gas supply path, the fuel-gas supply path and the fuel-gas circulation path being connected with each other at a connection point;
a first injector provided in the fuel-gas supply path at a position upstream of the connection point to adjust a flow rate of the fuel gas by intermittently ejecting the fuel gas, the first injector including a first nozzle;
an ejector provided at the connection point to generate negative pressure by ejecting the fuel gas from the first injector via the first nozzle, the ejector being provided to mix the fuel gas with the fuel offgas by suctioning the fuel offgas from the fuel-gas circulation path using the negative pressure;
a bypass flow path connecting an upstream section of the fuel-gas supply path located upstream of the first injector to a downstream section of the fuel-gas supply path located downstream of the ejector so as to cause the fuel gas to bypass the first injector and the ejector;
a second injector provided in the bypass flow path to adjust the flow rate of the fuel gas by intermittently ejecting the fuel gas, the second injector including a second nozzle;
a controller configured to control the first flow adjuster and the second flow adjuster;
an operational-state determiner configured to determine whether an operational state of the fuel cell system is one of
  a steady operational state in which requested electric power to be generated in the fuel cell fluctuates within a predetermined variation range, and
  an unsteady operational state in which the requested electric power fluctuates beyond the predetermined variation range;
a required-fuel-gas-flow-rate calculator configured to calculate a required fuel-gas flow rate based on the requested electric power; and
a first supply capability determiner configured to determine whether or not the required fuel-gas flow rate calculated by the required-fuel-gas-flow-rate calculator is within a first suppliable range of the first flow adjuster,
wherein if the operational-state determiner determines that the operational state is steady and if the first supply capability determiner determines that the required fuel-gas flow rate calculated by the required-fuel-gas-flow-rate calculator is within the first suppliable range, the controller only controls the first flow adjuster to eject the fuel gas, and
wherein if the operational-state determiner determines that the operational state is unsteady, the controller controls the first and second flow adjusters in correspondence with the required fuel-gas flow rate,
wherein if the operational-state determiner determines that the operational state is unsteady, the controller controls the first and second flow adjusters so that an ejecting time of the first flow adjuster per unit time is longer than an ejecting time of the second flow adjuster per unit time.

3. The fuel cell system according to claim 2, wherein if the operational-state determiner determines that the operational state is unsteady, the controller controls the first and second flow adjusters so that the second flow adjuster ejects the fuel gas within ejecting of the first flow adjuster.

4. A method for controlling a fuel cell system, comprising:
determining whether an operational state of the fuel cell system is one of
  a steady operational state in which requested electric power to be generated in a fuel cell of the fuel cell system fluctuates within a predetermined variation range, and
  an unsteady operational state in which the requested electric power fluctuates beyond the predetermined variation range;
calculating a required fuel-gas flow rate based on the requested electric power;
determining whether or not the required fuel-gas flow rate is within a first suppliable range of a first injector including a first nozzle and provided to adjust a flow rate of fuel gas by intermittently ejecting the fuel gas on an upstream side of an ejector provided to generate negative pressure by ejecting the fuel gas from the first injector, the first injector being positioned in a fuel-gas supply path at a position upstream of a connection point at which the fuel-gas supply path and a fuel-gas circulation path are connected with each other;
controlling the first injector and a second injector to adjust the flow rate of the fuel gas in correspondence with the required fuel-gas flow rate if it is determined that the operational state is unsteady, the second injector including a second nozzle and being provided to adjust the flow rate of the fuel gas by intermittently ejecting the fuel gas in a bypass flow path connecting an upstream side of the first injector to a downstream side of the ejector; and
controlling only the first injector to adjust the flow rate of the fuel gas if it is determined that the operational state is steady and if it is determined that the required fuel-gas flow rate is within the first suppliable range.

5. A fuel cell system comprising:
a fuel cell having a fuel-gas flow path and an oxidant-gas flow path;
a fuel-gas supply path which is connected to an inlet of the fuel-gas flow path and through which fuel gas to be supplied to the fuel-gas flow path flows;
a fuel-gas circulation path connecting an outlet of the fuel-gas flow path to the fuel-gas supply path to circulate the fuel gas by returning fuel offgas discharged from the fuel-gas flow path to the fuel-gas supply path, the fuel-gas supply path and the fuel-gas circulation path being connected with each other at a connection point;
a first flow adjuster provided in the fuel-gas supply path at a position upstream of the connection point to adjust a flow rate of the fuel gas by intermittently ejecting the fuel gas, the first flow adjuster including a nozzle;
an ejector provided at the connection point to generate negative pressure by ejecting the fuel gas from the first flow adjuster via the nozzle, the ejector being provided to mix the fuel gas with the fuel offgas by suctioning the fuel offgas from the fuel-gas circulation path using the negative pressure;
a bypass flow path connecting an upstream section of the fuel-gas supply path located upstream of the first flow adjuster to a downstream section of the fuel-gas supply path located downstream of the ejector so as to cause the fuel gas to bypass the first flow adjuster and the ejector;
a second flow adjuster provided in the bypass flow path to adjust the flow rate of the fuel gas by intermittently ejecting the fuel gas;
a controller configured to control the first flow adjuster and the second flow adjuster;
an operational-state determiner configured to determine whether an operational state of the fuel cell system is a steady operational state or an unsteady operational state; and
wherein if the operational-state determiner determines that the operational state is unsteady, the controller controls the first and second flow adjusters so that an ejecting time of the first flow adjuster per unit time is longer than an ejecting time of the second flow adjuster per unit time.

* * * * *